J. F. LAMB.
ART OF FORMING AND ATTACHING CAST METAL HANDLES TO CUTLERY.
APPLICATION FILED APR. 5, 1912.
1,059,674. Patented Apr. 22, 1913.
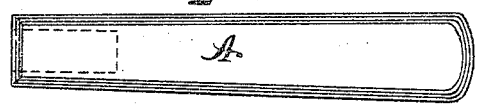
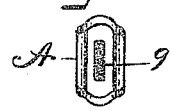
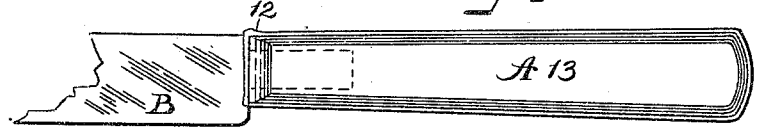
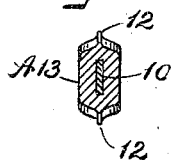
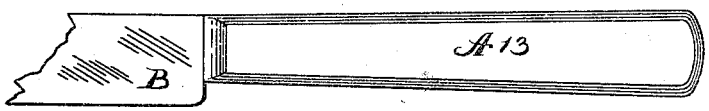
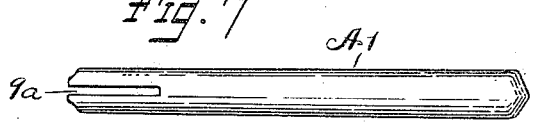
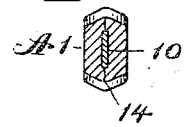
Witnesses:
S. H. Clarke
Theodore B. Schmidt
Inventor
Joseph F. Lamb.
By Louis M. Schmidt
Atty.

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION.

ART OF FORMING AND ATTACHING CAST-METAL HANDLES TO CUTLERY.

1,059,674. Specification of Letters Patent. Patented Apr. 22, 1913.

Application filed April 5, 1912. Serial No. 688,702.

*To all whom it may concern:*

Be it known that I, JOSEPH F. LAMB, a citizen of the United States, residing at New Britain, in the county of Hartford and State of Connecticut, have invented certain new and useful Improvements in the Art of Forming and Attaching Cast-Metal Handles to Cutlery, of which the following is a specification.

My invention relates to the art of forming and attaching cast metal handles to cutlery, and the objects of my improvement are economy in production and efficiency and superiority of the product.

In the accompanying drawings:—Figure 1 is a side elevation of a handle blank for a kitchen knife. Fig. 2 is an end view of the same showing that end to which the tool is to be applied. Fig. 3 is a side elevation of the combined blade and tang for which the said handle is designed. Fig. 4 is a broken off side elevation of the said blade and handle attached and partly finished. Fig. 5 is a transverse section of the same through the handle and tang. Fig. 6 is a broken off side elevation of the finished tool or knife. Fig. 7 is an edge view of a handle blank of a modified form, the same being designed for attachment to the form of blade and tang shown in Fig. 3. Fig. 8 is a transverse section through the handle and tang of a finished knife made from the blade and tang of Fig. 3 and the handle blank of Fig. 7.

I have illustrated my improvement as applied to forming and attaching cast aluminum handles to kitchen knives, but it may obviously be applied to table knives and forks and other articles of cutlery.

I first cast an aluminum handle blank A, in smooth metal molds and thereby produce a bright clean and fairly smooth soft metal handle that is free from sand or scale, and substantially in the desired form for the finished handle but some wider, thicker and longer. That end of the blank to which the cutlery implement is to be applied has a tang receiving opening 9, preferably cast therein as shown in Fig. 2. I prefer to employ aluminum from which to cast the handle blank on account of its lightness, its bright white and clean surface and its adaptability to be cast in metal molds and produce a casting that is free from scale and dross while at the same time it remains soft enough to enable the handle to be attached to its tang by pressure in dies when cold.

The knife or other blade B and its tang 10 may be made in any ordinary manner and the blade finished before attaching the handle. It is customary in grinding and finishing the blade to operate upon the contiguous portion of the tang, while the major portion of the tang is left untouched and in the rough. This leaves the body or butt end of the tang a trifle thicker than at its junction with the blade. The rough or unground portion 11 of the tang 10 is illustrated by shade lines in Fig. 3. If desired the same blade and tang may be attached to the form of handle blank A' shown in Fig. 7, in which the tang receiving opening 9ª is in the form of a slot that extends through the smaller end of the handle blank from edge to edge.

The blade and handle blank are placed in suitable dies with the tang of the blade extended into the tang receiving opening and then, when cold, subjected to compression under confinement with sufficient force to displace and rearrange the grains of the metal while it is firmly compacted against the entire surface of the tang and at the same time by such displacement the whole handle is solidified and its surface hardened, so that the metal will retain its pressure against the tang without giving back or loosening its grip thereon, as would be the case if the metal was merely forced against the tang without thus solidifying and hardening of entire shell of the handle. In order to thus solidify the surface it is essential that the dies, although of the same general form as the handle blank, should be a little smaller so as to insure the complete filling of all parts of the dies, leaving a slight fin of surplus metal 12 along the meeting line of the dies at the edges of the handle as indicated in Figs. 4 and 5. After removing the surplus metal or fin, the handle A¹³ is finished ready for buffing as shown in Fig. 6. The operation is the same whether one form of handle blank or the other is employed and there is no material difference in the product. The only difference in fact is that with the handle blank A' there is a seam 14 in the material, extending along each edge which may be discovered by a critical inspection, while in the handle blank A there is no such seam in the product. With either form of handle blank, both edges of the tang are completely inclosed and the handle is attached thereto so firmly that it can never be accidentally detached or loosened.

By my improvement the handle blanks may be cheaply formed by casting leaving a clean and bright surface which is subsequently made firmer and smoother in the compressing operation. This handle blank being free from scale and dross and of aluminum may be subjected to the compressing operation when cold, thereby attaching the handle without drawing the temper or otherwise injuring the previously finished blade. Forming and attaching the handles in the manner, and of the material specified, and then compressing the soft metal when under confinement in all directions and when cold insures a solid and firm attachment while the several operations are inexpensive.

I claim as my invention:—

That improvement in the art of securing the blade to the handle of a knife in which the tang of the knife is inserted in a recess in the handle and the handle is subjected to pressure in dies so that the walls of the said recess are closed over the said tang, comprising providing a handle having a recess at one end and providing a blade in the rough and the said blade comprising a blade proper and a tang extending longitudinally from one end thereof, finishing the surface of the said blade proper and at the same time finishing a portion of the said tang contiguous to the said blade proper, and leaving the butt end thereof in the original rough condition, the said recess being suitable to receive the said tang entire, including the said butt end and the adjacent finished portion thereof, inserting the said tang in the said recess and then compressing the said handle.

JOSEPH F. LAMB.

Witnesses:
 John W. Abell,
 Oscar Moberg.